(12) United States Patent
Clift

(10) Patent No.: US 10,791,296 B2
(45) Date of Patent: Sep. 29, 2020

(54) APPARATUS AND METHOD FOR TUNER CONTROL BY MIDDLEWARE

(71) Applicant: SONY CORPORATION, Tokyo (JP)

(72) Inventor: Graham Clift, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/199,114

(22) Filed: Nov. 23, 2018

(65) Prior Publication Data

US 2020/0169685 A1    May 28, 2020

(51) Int. Cl.
| | |
|---|---|
| *H04N 5/44* | (2011.01) |
| *H04H 20/26* | (2008.01) |
| *H04N 5/50* | (2006.01) |
| *H04N 21/438* | (2011.01) |
| *H04N 21/443* | (2011.01) |

(52) U.S. Cl.
CPC .......... *H04N 5/4401* (2013.01); *H04H 20/26* (2013.01); *H04N 5/50* (2013.01); *H04N 21/4384* (2013.01); *H04N 21/4433* (2013.01)

(58) Field of Classification Search
CPC ................................................. H04N 5/4401
See application file for complete search history.

(56) References Cited

U.S. PATENT DOCUMENTS

| | | | |
|---|---|---|---|
| 2017/0272691 A1 | 9/2017 | Song et al. | |
| 2018/0007307 A1* | 1/2018 | Walker | H04H 60/19 |
| 2018/0198671 A1* | 7/2018 | Kwon | H04N 21/234 |

FOREIGN PATENT DOCUMENTS

CA    3 014 16 2 A1    8/2017

OTHER PUBLICATIONS

International Search Report and Written Opinion of the International Searching Authority dated Feb. 26, 2020, in PCT/IB2019/060009, citing documents AA and AO therein, 16 pages.

* cited by examiner

*Primary Examiner* — Michael H Hong
(74) *Attorney, Agent, or Firm* — Oblon, McClelland, Maier & Neustadt, L.L.P.

(57) ABSTRACT

A reception apparatus includes processing circuitry. The processing circuitry is configured to receive IP packets that include signaling information originating from an Advanced Television Systems Committee (ATSC) broadcast stream received by a tuner device, the broadcast stream including a plurality of physical layer pipes (PLPs), each PLP containing a plurality of ATSC link-layer protocol (ALP) packets. The processing circuitry is configured to extract the signaling information from the IP packets, the signaling information including a link mapping table (LMT) and at least one low level signaling (LLS) table. The LMT is identified based on a predetermined IP address and port designated to indicate the presence of the LMT. The processing circuitry is further configured to retrieve, based on the extracted LMT and extracted at least one LLS table, audio and visual content corresponding to a service associated with the broadcast stream.

20 Claims, 14 Drawing Sheets

| Syntax | No. of bits | Format |
|---|---|---|
| link_mapping_table() { | | |
|   num_PLPs_minus1 | 6 | uimsbf |
|   reserved | 2 | '11' |
|   for (i=0; i<=num_PLPs_minus1; i++) { | | |
|     PLP_ID | 6 | uimsbf |
|     reserved | 2 | '11' |
|     num_multicasts | 8 | uimsbf |
|     for (j=0; j<num_multicasts; j++) { | | |
|       src_IP_add | 32 | uimsbf |
|       dst_IP_add | 32 | uimsbf |
|       src_UDP_port | 16 | uimsbf |
|       dst_UDP_port | 16 | uimsbf |
|       SID_flag | 1 | bslbf |
|       compressed_flag | 1 | bslbf |
|       reserved | 6 | '111111' |
|       if (SID_flag == 1) { | | |
|         SID | 8 | uimsbf |
|       } | | |
|       if (compressed_flag == 1) { | | |
|         context_id | 8 | uimsbf |
|       } | | |
|     } | | |
|   } | | |
| } | | |

| Syntax | No. of bits | Format | Value |
|---|---|---|---|
| ALP_packet_header() { | | | |
|   packet_type | 3 | uimsbf | '100' |
|   payload_configuration | 1 | bslbf | '0' |
|   header_mode | 1 | bslbf | '0' |
|   length | 11 | uimsbf | var |
| } | | | |
| signaling_information_hdr() { | | | |
|   signaling_type | 8 | uimsbf | 0x01 |
|   signaling_type_extension | 16 | bslbf | 0xFFFF |
|   signaling_version | 8 | uimsbf | Var |
|   signaling_format | 2 | uimsbf | '00' |
|   signaling_encoding | 2 | uimsbf | '00' |
|   reserved | 4 | '1111' | '1111' |
| } | | | |
| link_mapping_table() { | | | |
|   (Fig. 9) | | | |
| } | | | |

| Syntax | No. of bits | Format | Value |
|---|---|---|---|
| ALP_packet_header() { | | | |
|     packet_type | 3 | uimsbf | '000' |
|     payload_configuration | 1 | bslbf | '0' |
|     header_mode | 1 | bslbf | '0' |
|     length | 11 | uimsbf | var |
| } | | | |
| IP Header { | | | |
|     Version | 4 | uimsbf | 4 |
|     IHL | 4 | uimsbf | 5 |
|     Type of Service | 8 | uimsbf | 0 |
|     Total Length | 16 | uimsbf | var |
|     Identification | 16 | uimsbf | 0 |
|     reserved0 | 1 | '0' | '0' |
|     DF | 1 | '0' | '0' |
|     MF | 1 | '0' | '0' |
|     Fragment Offset | 13 | umisbf | 0x0000 |
|     Time to Live | 8 | uimsbf | 0xFF |
|     Protocol | 8 | uimsbf | 0xFF |
|     Header Checksum | 16 | uimsbf | 0x0000 |
|     Source Address | 32 | uimsbf | 0x00000000 |
|     Destination Address | 32 | uimsbf | 0xE000173C |
| } | | | |
| UDP Header { | | | |
|     Source Port | 16 | uimsbf | 0x0000 |
|     Destination Port | 16 | uimsbf | 0x134A |
|     Length | 16 | uimsbf | var |
|     Checksum | 16 | uimsbf | 0x0000 |
| } | | | |
| LMT Header { | | | |
|     LMT_version | 8 | uimsbf | var |
|     reserved0 | 2 | '00' | '00' |
|     LMT_PLP_ID | 6 | uimsbf | var |
| } | | | |
| link_mapping_table() { | | | |
|     (Fig. 9) | | | |
| } | | | |

FIG. 11

APPARATUS AND METHOD FOR TUNER CONTROL BY MIDDLEWARE

BACKGROUND

Technical Field

The present disclosure relates generally to an apparatus and method for controlling a tuner through middleware.

Description of the Related Art

An Advanced Television Systems Committee (ATSC) 3.0 broadcast signal may include one or more Physical Layer Pipes (PLPs). Each PLP can be modulated and encoded using one of the modes defined in ATSC Standard A/322— Physical Layer Protocol, dated Jun. 6, 2017, the entirety of which is incorporated by reference (hereinafter "A/322 Standard"). Accordingly, some PLPs may be more robust than others. One ATSC 3.0 broadcast must include at least one PLP and can include an upper limit of 64 PLPs. However, receivers that process the broadcast stream may be limited to handling a maximum of four PLPs to ensure that practical receiver designs can be made since significant hardware resources are required for each PLP processor in the receiver's tuner/demod submodule. Furthermore, depending on the type of time interleaving the broadcaster has chosen for delivery of a specific PLP, practical receivers may be able to process only one PLP of that type at any given time. Accordingly, when more than one PLP is present in the broadcast, the receiver needs an efficient method to determine which PLPs are required to be demodulated to provide a service.

SUMMARY

According to an embodiment of the present disclosure, there is provided a reception apparatus that includes processing circuitry. The processing circuitry is configured to receive IP packets that include signaling information originating from an Advanced Television Systems Committee (ATSC) broadcast stream received by a tuner device, the broadcast stream including a plurality of physical layer pipes (PLPs), each PLP containing a plurality of ATSC link-layer protocol (ALP) packets. The processing circuitry is further configured to extract the signaling information from the IP packets, the signaling information including a link mapping table (LMT) and at least one low level signaling (LLS) table, the LMT being identified based on a predetermined IP address and port designated to indicate the presence of the LMT. The processing circuitry is further configured to retrieve, based on the extracted LMT and extracted at least one LLS table, audio and visual content corresponding to a service associated with the broadcast stream.

According to an embodiment of the present disclosure, there is provided a tuner device that includes a communication interface configured to connect to a reception apparatus that executes a television receiver application and processing circuitry. The processing circuitry is configured to: (i) receive a digital television broadcast signal that includes a plurality of physical layer pipes (PLPs), each PLP containing a plurality of ATSC link-layer protocol (ALP) packets, (ii) identify at least one PLP from the plurality PLPs that includes low level signaling (LLS), (iii) extract a link mapping table (LMT) from the at least one PLP including the LLS, (iv) generate an ALP packet including an IP packet, which contains the LMT and has a predetermined IP address and port, and (v) transfer the ALP packet containing the IP packet with the LMT to the television receiver application.

According to an embodiment of the present disclosure, there is provided a non-transitory computer-readable medium storing instructions, which when executed by a processor, causes the processor to perform a method. The method includes receiving IP packets that include signaling information originating from an Advanced Television Systems Committee (ATSC) broadcast stream received by a tuner device, the broadcast stream including a plurality of physical layer pipes (PLPs), each PLP containing a plurality of ATSC link-layer protocol (ALP) packets. The method further includes extracting the signaling information from the IP packets, the signaling information including a link mapping table (LMT) and at least one low level signaling (LLS) table, the LMT being identified based on a predetermined IP address and port designated to indicate the presence of the LMT. The method further includes retrieving, based on the extracted LMT and extracted at least one LLS table, audio and visual content corresponding to a service associated with the broadcast stream.

According to an embodiment of the present disclosure, there is provided a non-transitory computer-readable medium storing instructions, which when executed by a processor, causes the processor to perform a method. The method includes receiving a digital television broadcast signal that includes a plurality of physical layer pipes (PLPs), each PLP containing a plurality of ATSC link-layer protocol (ALP) packets. The method includes identifying at least one PLP from the plurality PLPs that includes low level signaling (LLS). The method includes extracting a link mapping table (LMT) from the at least one PLP including the LLS. The method includes generating an ALP packet including an IP packet, which contains the LMT and has a predetermined IP address and port. The method further includes transferring the ALP packet containing the IP packet with the LMT to a reception apparatus that executes a television receiver application.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 illustrates an exemplary link mapping table (LMT).

FIG. 10 illustrates an exemplary ALP packet encapsulating a LMT.

FIG. 11 illustrates an exemplary ALP packet with an IP packet containing the LMT.

DETAILED DESCRIPTION

Figure 1:
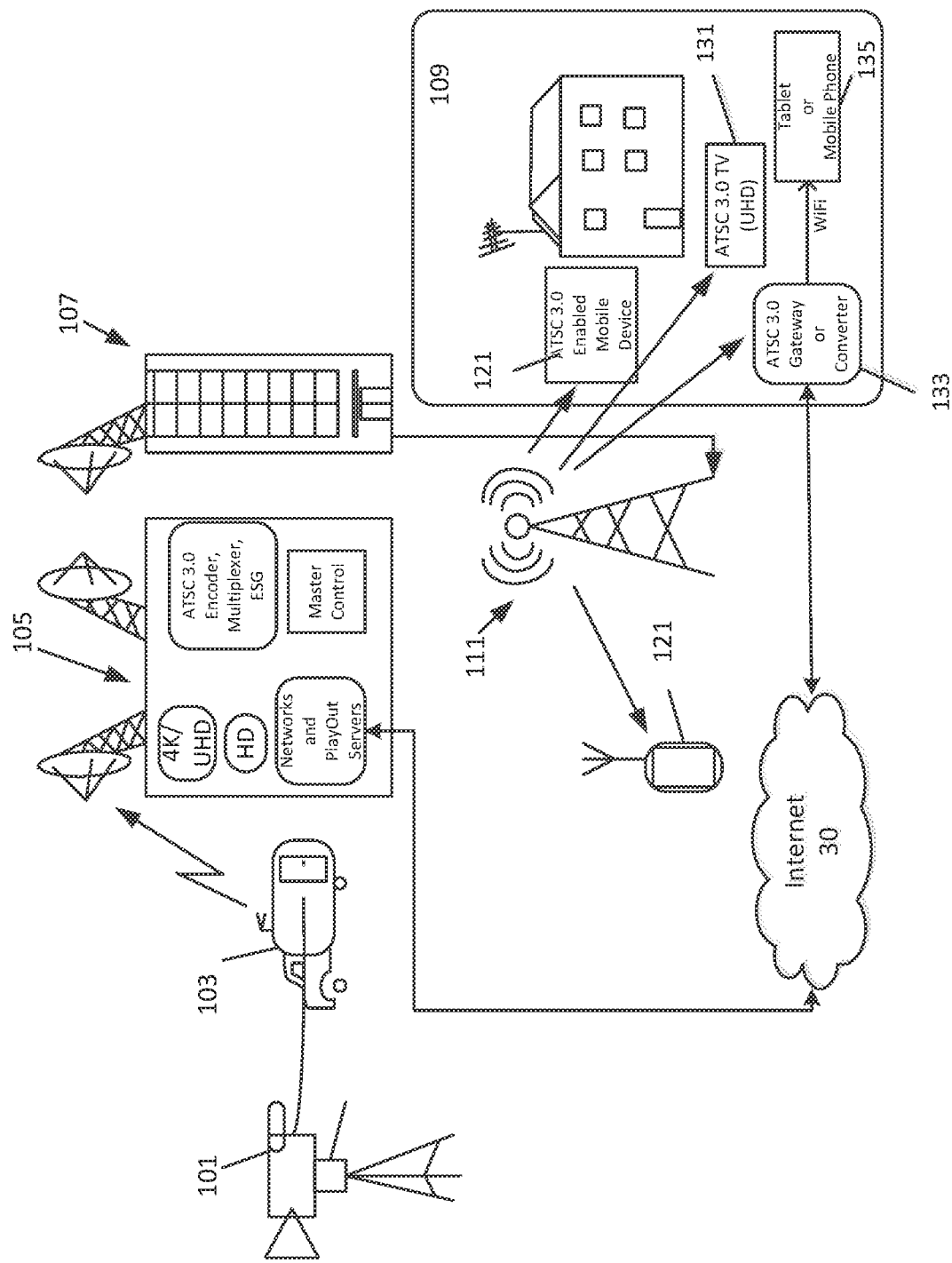
FIG. 1 is a schematic that shows basic components of a digital television (DTV) system based on ATSC 3.0 standards.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic service guide (ESG) as a single television program, without regard for whether the content is a movie, sporting event, segment of a multi-part series, news broadcast, etc. The term may also be interpreted to encompass commercial spots and other program-like content which may not be reported as a program in an ESG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In the present disclosure, Android is a mobile operating system maintained by Google LLC. and was designed primarily for touchscreen devices. Application software runs on an application framework which includes a Java library based on Open JDK. In the present disclosure, the current version of USB is USB 3.0 which can accommodate a data transfer speed of up to 5 Gbit/s.

Some embodiments of the present disclosure involve electronic devices such as a smartphone, tablet, laptop, etc. These types of devices are considered as non-TV devices because while these devices can stream content, they do not have the capability to tune to a television broadcast without additional hardware and software. The present disclosure may also involve electronic devices such as televisions which do not have the ability to tune to a television broadcast without additional hardware and software (e.g., a television that includes an ATSC 1.0 tuner but not a ATSC 3.0 tuner), or to which additional tuner functionality is to be added (e.g., additional or replacement ATSC 3.0 tuner added to a television that already includes an ATSC 3.0 tuner).

In some embodiments, an ATSC "service" is a collection of media components and/or metadata delivered to receivers in aggregate. Components may be of multiple media types. A service may be either continuous or intermittent. A service can be in real time or non-real time, where a real time service may include a sequence of TV Programs.

An example of a real-time service is live broadcast streaming audio/video content. Examples of non-real-time services include, but are not limited to video-on-demand, or other interactive content like one might find on a web page. Also some or all components of an ATSC 3.0 service may be delivered via the broadband (internet) path. A service that includes components from both broadcast and broadband is called a "hybrid" service.

FIG. 1 is a diagram showing an arrangement of basic components for an ATSC 3.0 system. Video technology is moving from High Definition (HD) digital television to higher resolution technologies, including 4K and 8K video, High Dynamic Range (HDR), wide color gamut, and high frame rate. Subsequently, the ATSC 3.0 system may include a digital video camera 101 that can capture Ultra High Definition (UHD) video, possibly remotely in conjunction with a mobile transmission unit 103 that provides a signal for a TV station 105. The TV station 105 includes, among other things, facilities for television production and broadcast control. Using ATSC 3.0, an encoder and multiplexer may generate IP packets for a television broadcast. The television broadcast may be transmitted with an ESG to one or more transmitter sites 107. An ATSC 3.0 transmitter site may include an ATSC 3.0 waveform transmitter that transmits radio frequency (RF) signals via a tower transmit antenna 111. The ATSC 3.0 content may be received in a home, office building, library, shop or restaurant 109 by an ATSC 3.0 TV 131, an ATSC 3.0 Gateway or Converter 133, or an ATSC 3.0 enabled mobile device 121. A tablet or smartphone 135 may obtain the broadcast content via a WiFi signal provided from the Gateway or Converter. Alternatively, outside a place of business or a home, tablets, smartphones or other mobile devices 121 may pick up the broadcast waveform from a tower transmit antenna 111. Such mobile devices 121 may be used by a pedestrian, within a personal vehicle or within a mode of public transportation. Furthermore, the ATSC 3.0 Gateway and Networks and Playout Servers in TV station 105 may communicate with each other via Internet 30.

Mobile operating systems, such as the Android operating system developed by Google LLC, are operating systems for phones, tablets, smartwatches, or other mobile devices and include features for mobile or handheld use. For example, mobile devices may include mobile features of cellular communication, Global Positioning System (GPS) navigation, video or single frame cameras, speech recognition, and typically a touchscreen. Examples of other mobile operating systems include iOS, Windows 10 Mobile, etc. In particular, the Android operating system has been designed primarily for touchscreen devices. Typically, application software for the Android operating system runs on an application framework which includes a Java library based on Open JDK (Java Development Kit).

In the present disclosure, a DTV broadcaster, or simply broadcaster as used herein, relates to a local television station that transmits content via radio waves as a terrestrial television transmission.

An ATSC 3.0 system has a layered architecture defined as a physical layer, protocols layer, management layer, and applications and presentation layer. Details of the ATSC 3.0 system is found in, for example, ATSC Standard A/300—ATSC 3.0 System, dated Oct. 19, 2017, the entirety of which is incorporated by reference (hereinafter "A/300 Standard"). At the transmitter side, the system architecture for an RF channel may include four main parts: Input Formatting, Bit Interleaved and Coded Modulation (BICM), Framing and Interleaving, and Waveform Generation. In the Input formatting and BICM parts, the Physical Layer Pipe (PLP) is a stream of data encoded with a specific modulation, code rate and length. There may be only a single PLP for an RF channel. The maximum number of PLPs in each RF channel is 64 according to one embodiment. A PLP may be delivered in a time interleaved format, employing either Convolutional Time Interleaving (CTI) or Hybrid Time Interleaving (HTI) modes of operation. The input formatting part formats input data packets into output packets called ATSC Link Layer Protocol (ALP) packets. The length of each ALP packet is variable. The input formatting part maps the ALP packets to Baseband Packets, which include a header and a payload containing ALP packets. Baseband packets have fixed length, with the length determined by the outer code type, inner code rate and code length chosen for the target PLP.

Figure 2:
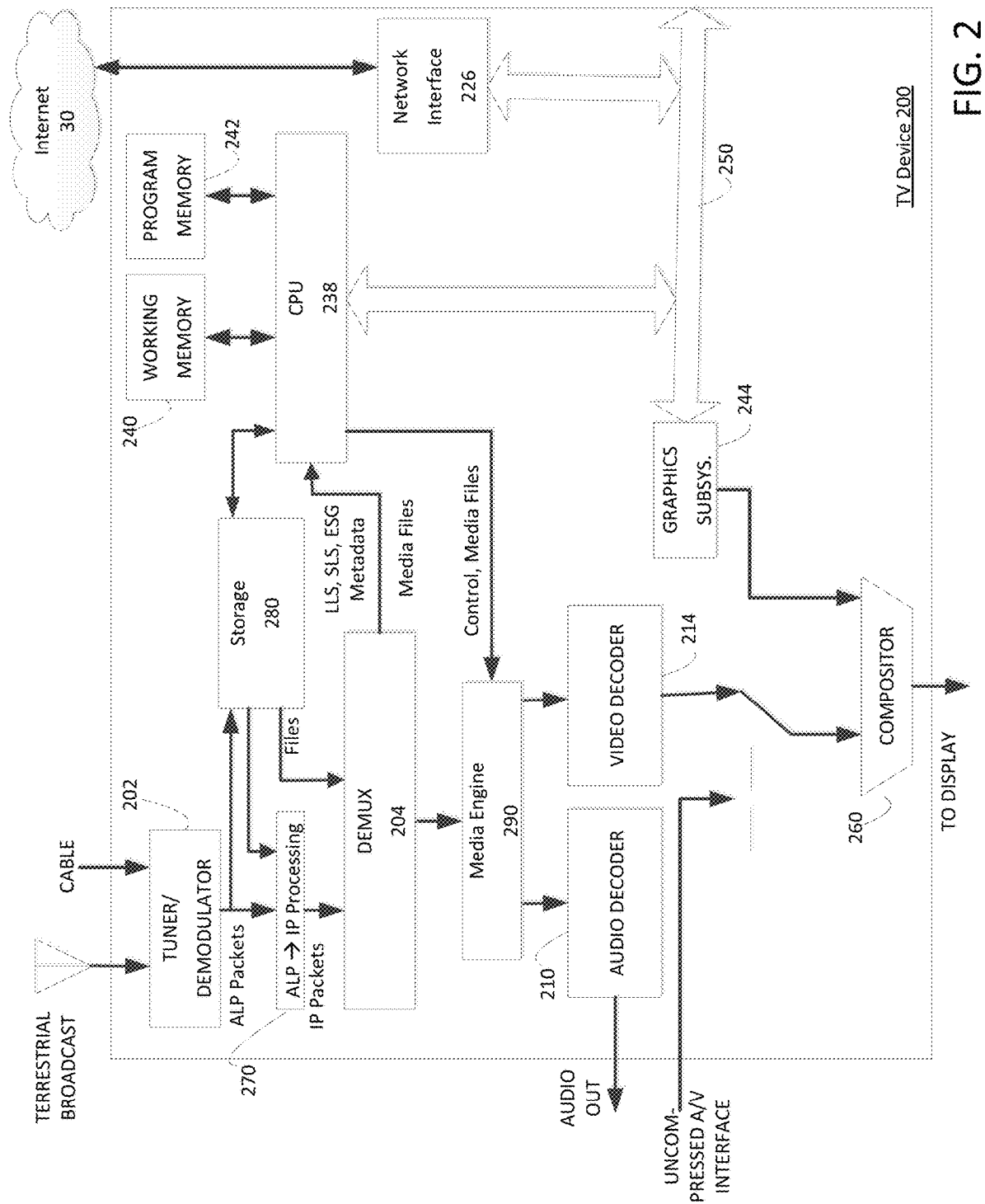
FIG. 2 illustrates an exemplary TV device.

FIG. 2 illustrates an exemplary TV device 200 such as TV 131 (FIG. 1), which is configured to access television content and broadcaster applications. The TV device 200 may be a digital television receiver that is incorporated in a vehicle or any of the fixed or mobile devices described above.

The TV device 200 includes receiver circuitry that is configured to receive a data stream (e.g., a broadcast stream) from broadcasters and processing circuitry that is configured to perform various functions of the TV device 200. In one embodiment, a tuner/demodulator 202 receives broadcast emissions containing the broadcast stream. Depending on the embodiment, the TV device 200 may alternatively or additionally be configured to receive a cable television transmission or a satellite broadcast. The TV device can also communicate with the Internet 30 via a network interface 226.

When an ATSC 3.0 broadcast emission has been acquired by the tuner/demodulator 202, data packets such as ALP packets are forwarded to a ALP to IP processor 270 that converts these packets to Internet Protocol (IP) packets for further processing. ALP packets may also be buffered and saved to persistent storage 280.

A demultiplexer 204 may demultiplex the data stream, which has been converted to IP packets, using any necessary files from storage 280, and deliver the demultipexed data to media engine 290 for decoding into separate audio and video (A/V) streams. Files that are outputted by the demultiplexer 204 such as metadata, Low Level Signaling (LLS) and the Service Layer Signaling (SLS) files, media files, and ESG files may be provided to the CPU 238 for processing. The audio is decoded by an audio decoder 210 and the video is decoded by a video decoder 214. Further, uncompressed A/V data may be received via an uncompressed A/V interface (e.g., a HDMI interface), if available.

The TV device 200 generally operates under control of at least one processor, such as the CPU 238, which is coupled to the persistent storage 280, a working memory 240, program memory 242, and a graphics subsystem 244 via one or more buses (e.g., bus 250). The graphics outputted by the graphics subsystem 244 are combined with video images by the compositor and video interface 260 to produce an output suitable for display on a video display.

The CPU 238 operates to carry out functions of the TV device 200 including executing script objects (control objects) contained in a broadcaster application (e.g., HTML5 application), native broadcaster application, etc., using for example an HTML5 user agent stored in the program memory 242.

In one embodiment, the collection of files making up the broadcaster application can be delivered over broadcast as packages, via the ROUTE protocol described in ATSC Standard A/331—Signaling, Delivery, Synchronization, and Error Protection, dated Dec. 6, 2017, the entirety of which is incorporated by reference (hereinafter "A/331 Standard"). An exemplary protocol for delivery of broadcaster applications is described in ATSC Standard A/344—ATSC 3.0 Interactive Content, dated Dec. 18, 2017, the entirety of which is incorporated by reference (hereinafter "A/344 Standard").

The CPU 238 may be coupled to any one or a combination of the TV device 200 resources to centralize control of one or more functions, in certain embodiments. In one embodiment, the CPU 238 also operates to oversee control of the TV device 200 including the tuner/demodulator 202 and other television resources.

Figure 3:
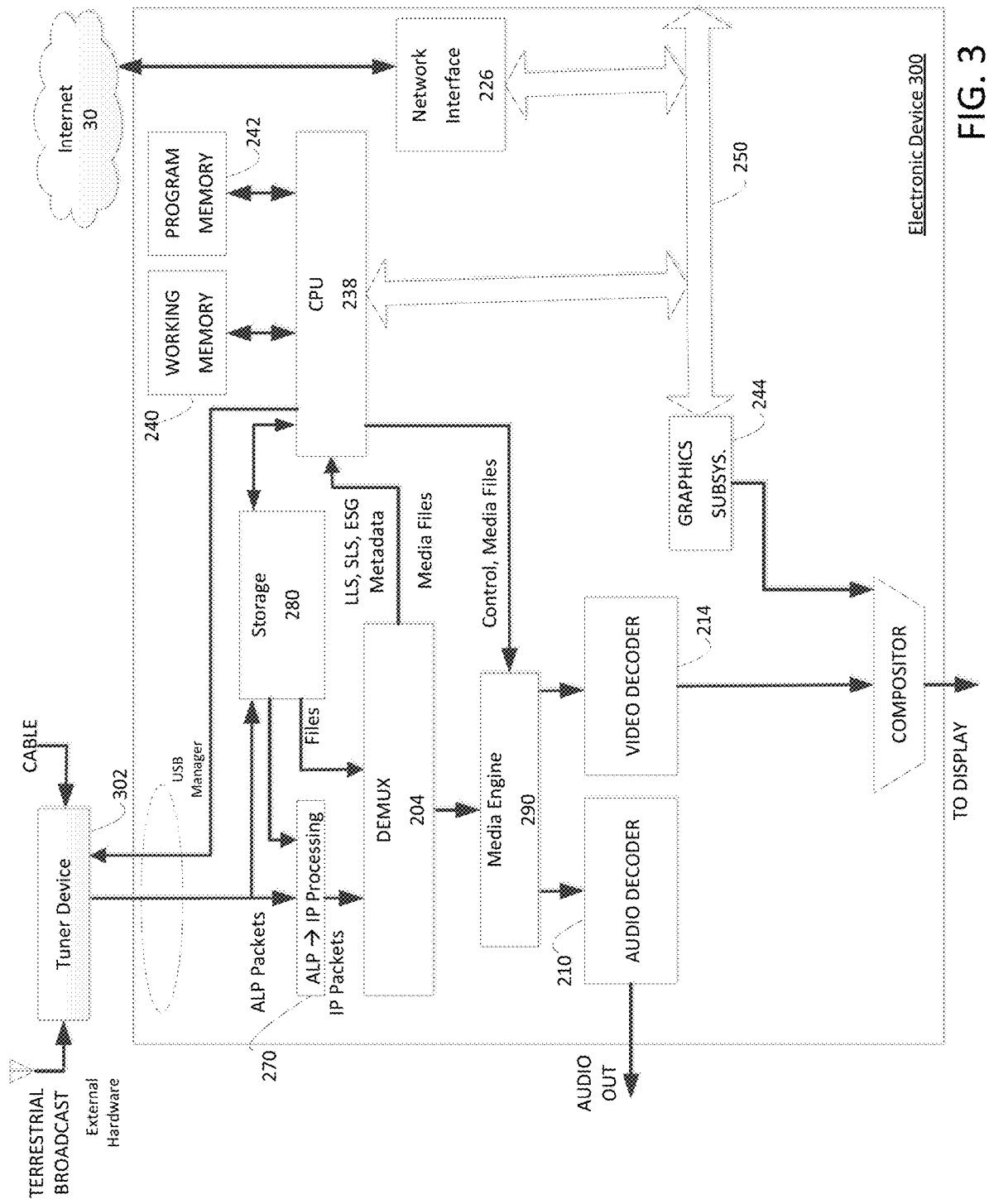
FIG. 3 illustrates an exemplary electronic device.

FIG. 3 illustrates an embodiment of an electronic device 300, which is configured to access television content and applications via a tuner device (e.g., including a tuner/demodulator) 302 that is configured to connect to the electronic device 300 via a USB. The tuner device 302 connects to the electronic device 300 via other wireless (e.g., WiFi) or wired interfaces in other embodiments. The electronic device 300 may be a fixed device such as a set top box or a mobile or portable device such as a smartphone, tablet computer, laptop, or portable computer. The electronic device 300 may also be a television to which additional tuner functionality is added. Components of the electronic device 300 having similar numbered components with respect to the TV device 200 may provide the same functions as described above for the TV device 200.

In some embodiments, the tuner device 302 receives an instruction to tune to a particular RF channel (e.g., 6 MHz frequency band) to obtain an RF broadcast signal. When the 6 MHz frequency the tuner is set to acquire contains an ATSC 3.0 broadcast signal, the demodulation process yields ALP packets that are first converted to UDP/IP packets and then fed to middleware and upper-layer software processing in the receiver.

The broadcast signal includes one or more PLPs. As described in the A/322 standard, a broadcaster may choose one of several time interleaver modes for the delivery of a given PLP: none, HTI or CTI. Due to practical constraints on its design, for a receiver to process any PLP that uses CTI interleaver mode, all of its processing resources must be used. In contrast, for PLPs that use HTI interleaver mode, a practical receiver has sufficient resources to be able to process four such PLPs in parallel. In order to accommodate limitations inherent in practical receiver design, the ATSC 3.0 standard requires broadcasters to construct ATSC services such that the number of PLPs that must be processed concurrently to present one service does not exceed these limits. Thus, if HTI interleaver mode is used, the broadcaster must construct the multiplex such that the number of PLPs the receiver must process concurrently is no more than four, and if CTI interleaver mode is used for delivery of a service, all the components of that service must be delivered within one PLP.

As discussed above, this limitation on the type and use of PLPs was established to ensure that practical receiver designs can be made due to the significant hardware resources are required for each PLP processor in the receiver's tuner. When a tuner device is located in external hardware, the PLP processors may also be included in the external hardware. In some embodiments, at least one PLP carries Low Level Signaling (LLS) tables. LLS tables in the broadcast emission are used by receivers to identify the presence and characteristics of each ATSC 3.0 service. Data about each service may include the channel name and number and source/destination IP address/port values used to deliver the media associated with the service. One type of LLS table is a Service List Table (SLT), which is defined in the A/331 Standard.

Each PLP carries ALP packets. An ALP packet may encapsulate an Internet Protocol (IP) packet, an MPEG-2 Transport Stream (MPEG-2 TS) packet, a link layer signaling packet, or it can be a null packet. In some embodiments, broadcast emissions defined by the ATSC 3.0 standard define data transport for service signaling and streaming media content in multicast UDP/IP packets.

Figure 4:
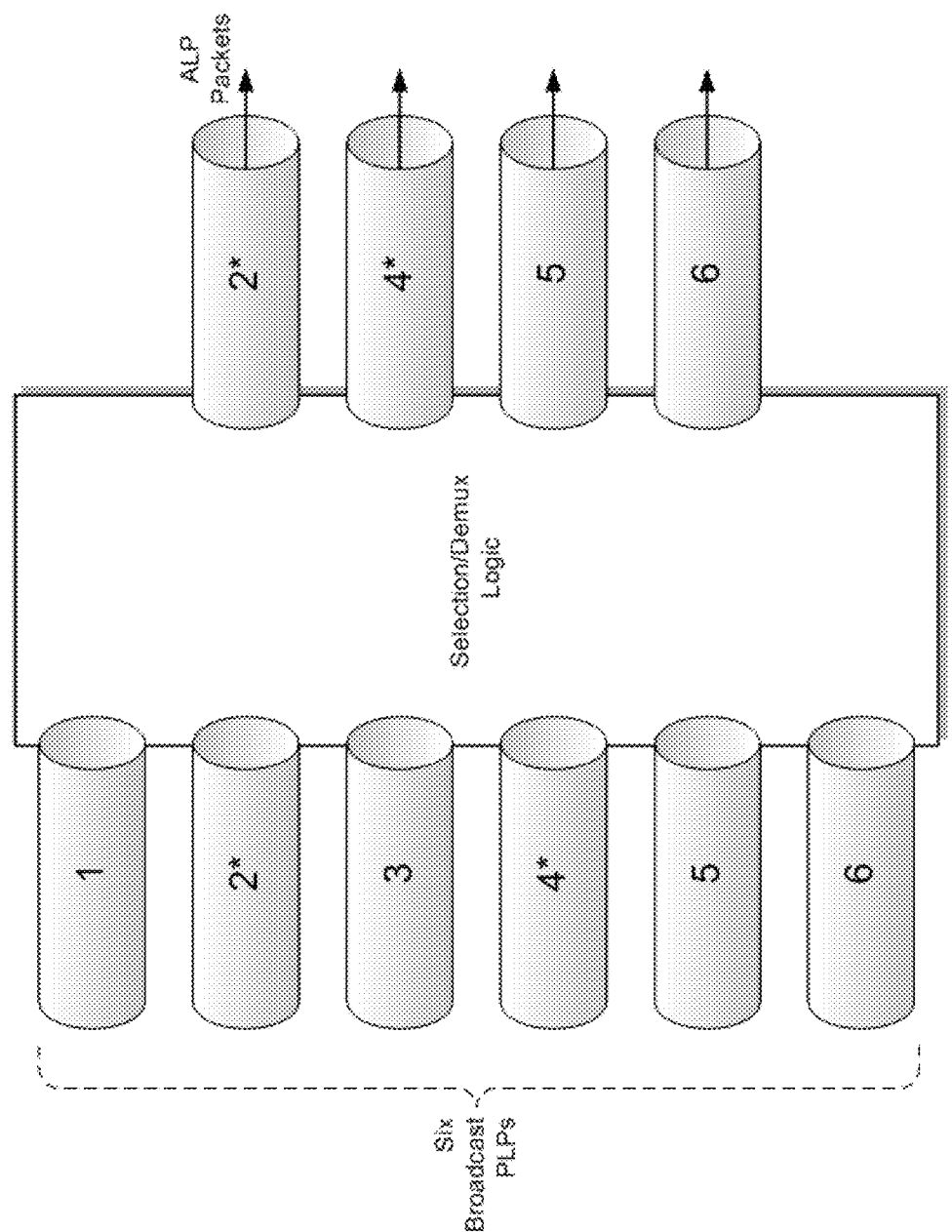
FIG. 4 illustrates an exemplary selection of a group of PLPs.

FIG. 4 illustrates an example broadcast emission that includes six PLPs, delivered using HTI time interleaver mode, with PLP ID values 1-6. The PLP ID may be a reference number associated with each PLP such as the L1D_plp_id as specified in the A/322 Standard. In this example, the PLPs that are marked with a * carry LLS tables.

Some ALP packets may carry link-layer signaling tables including a Link Mapping Table (LMT). The LMT may be defined in accordance with Section 7.1.1 of ATSC Standard A/330—Link-Layer Protocol, dated Sep. 19, 2016 (hereinafter "A/330 Standard"). The entirety of the A/330 Standard is hereby incorporated by reference. In some embodiments, an LMT is present in any PLP identified as carrying LLS. A PLP may be identified as carrying LLS when a flag designated for indicating the presence of LLS (e.g., the L1D_plp_lls_flag as defined in the A/322 Standard, Section 9.3.4) is set to '1'. Each instance of the LMT may describe mappings between PLPs and IP addresses/ports for any IP address/port associated with any service referenced in the Service List Table (SLT) (see A/331 Standard, Section 6.3) carried in the identified PLP carrying the LLS tables. For example, the SLT may specify a plurality of IP addresses for a selected service, and the LMT provides the mapping between IP addresses specified in the SLT and the PLPs.

In the example shown in FIG. 4, PLPs #2 and #4 carry LLS tables. The Selection/Demux Logic shown in FIG. 4 may be configured to select four of the six transmitted PLPs and deliver to the middle and upper layers of processing in the receiver the ALP packets contained in these selected PLPs. The four PLPs chosen include #2 and #4 as well as #5 and #6. ALP packets from these four PLPs are passed to the next level of processing in the receiver. The selection/demux logic illustrated in FIG. 4 may be located in the tuner.

Accordingly, as illustrated in FIG. 4, at one point in time in the receiver's processing of the received ATSC 3.0 broadcast, a decision may need to be made as to which PLPs should be processed and monitored and which may be disregarded. Furthermore, some operations in the receiver such as the "channel scan" require spending time on all PLPs carrying LLS, and the broadcast may include more than four PLPs carrying LLS or multiple PLPs where at least one uses CTI time interleaver mode. In this scenario, it may not be possible to simultaneously monitor all PLPs carrying LLS, and a process that sequences through the PLPs so that all the LLS tables can be collected from the broadcast during the scan must be performed.

According to some embodiments, when more than a predetermined number of PLPs (e.g., four in HTI mode or one in CTI mode) are broadcast in a single ATSC 3.0 broadcast emission, the tuner device must choose at most the predetermined number from the available set. In other embodiments, the number of PLPs that can be selected and processed at a time may be less than or more than four. Although the receiver may contain logic that determines the selection of the PLPs to process, this logic may need some information that is not available at the lower levels.

For example, a user may select for viewing a service that requires three PLPs: (1) one delivers the LLS tables and the video component, (2) a separate one delivers the audio track in the user's preferred language, and (3) a third one delivers the closed captioning and interactive content (e.g., application) files. The tuner device selects these three PLPs to satisfy the user's request for this service. However, prior to this selection, the tuner device does not have the knowledge of what service(s) the user has selected or visibility as to the structure of that service.

Figure 5:
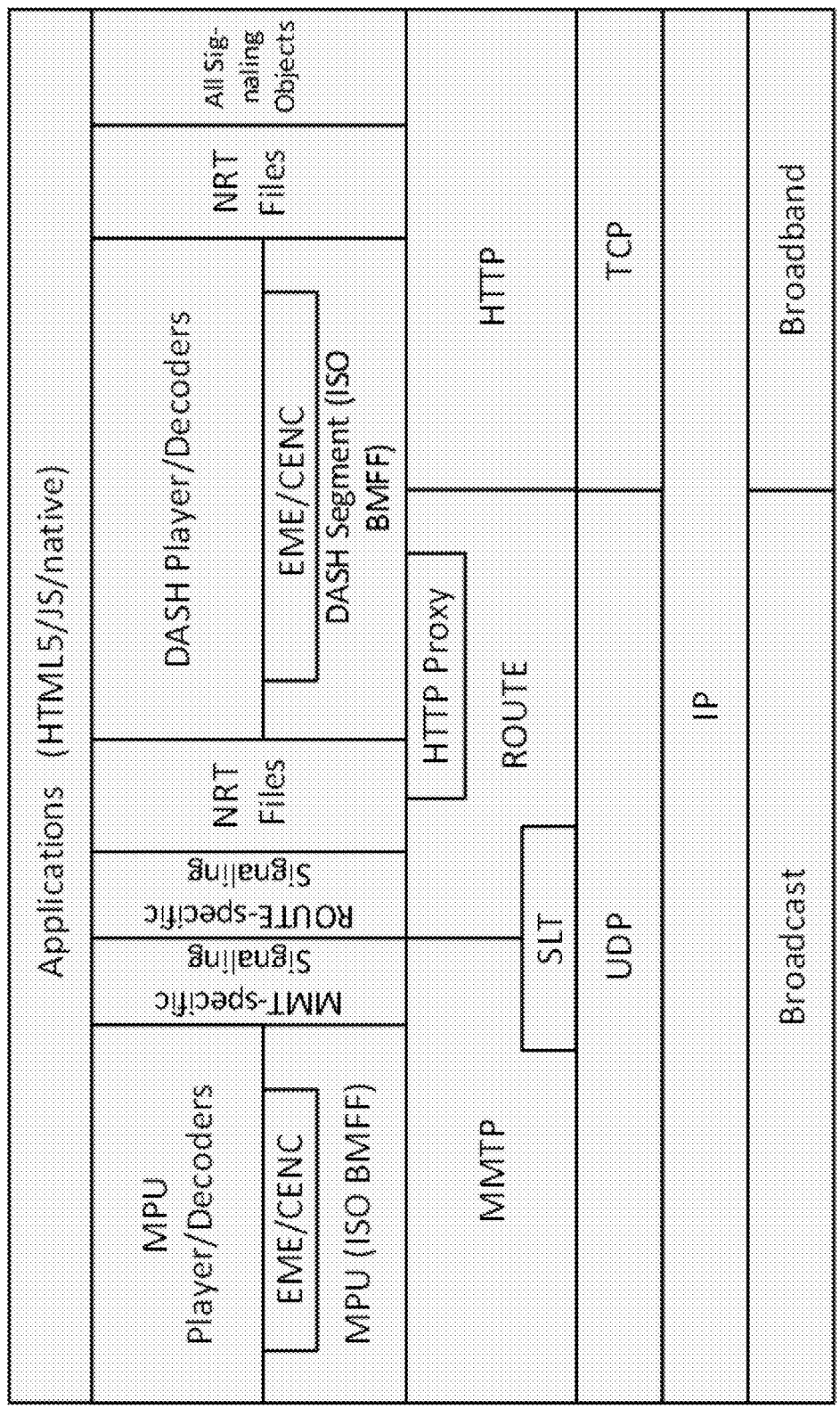
FIG. 5 illustrates an exemplary protocol stack.

FIG. 5 illustrates an embodiment of a "conceptual protocol stack" for the ATSC 3.0 receiver. Information for each field specified in the conceptual stack is found in the A/331 Standard. As illustrated in FIG. 5, the lower levels of the protocol stack are the physical layer broadcast, which delivers UDP/IP packets in ALP packets. The SLT may be delivered in UDP/IP packets with a predetermined IP source address and port number that has been designated for the SLT. Other signaling tables, as referenced in the SLT, may be delivered in IP packets. Additional IP packets may contain streaming multimedia files comprising the service.

The determination as to which ALP and IP packets reach the upper layers is based on which PLP the tuner device has been configured to process. Accordingly, embodiments of the present disclosure are directed to enabling middleware processes in a receiver to access the information needed to provide commands to the tuner device that enable the tuner device to process specific PLPs.

Figure 6:
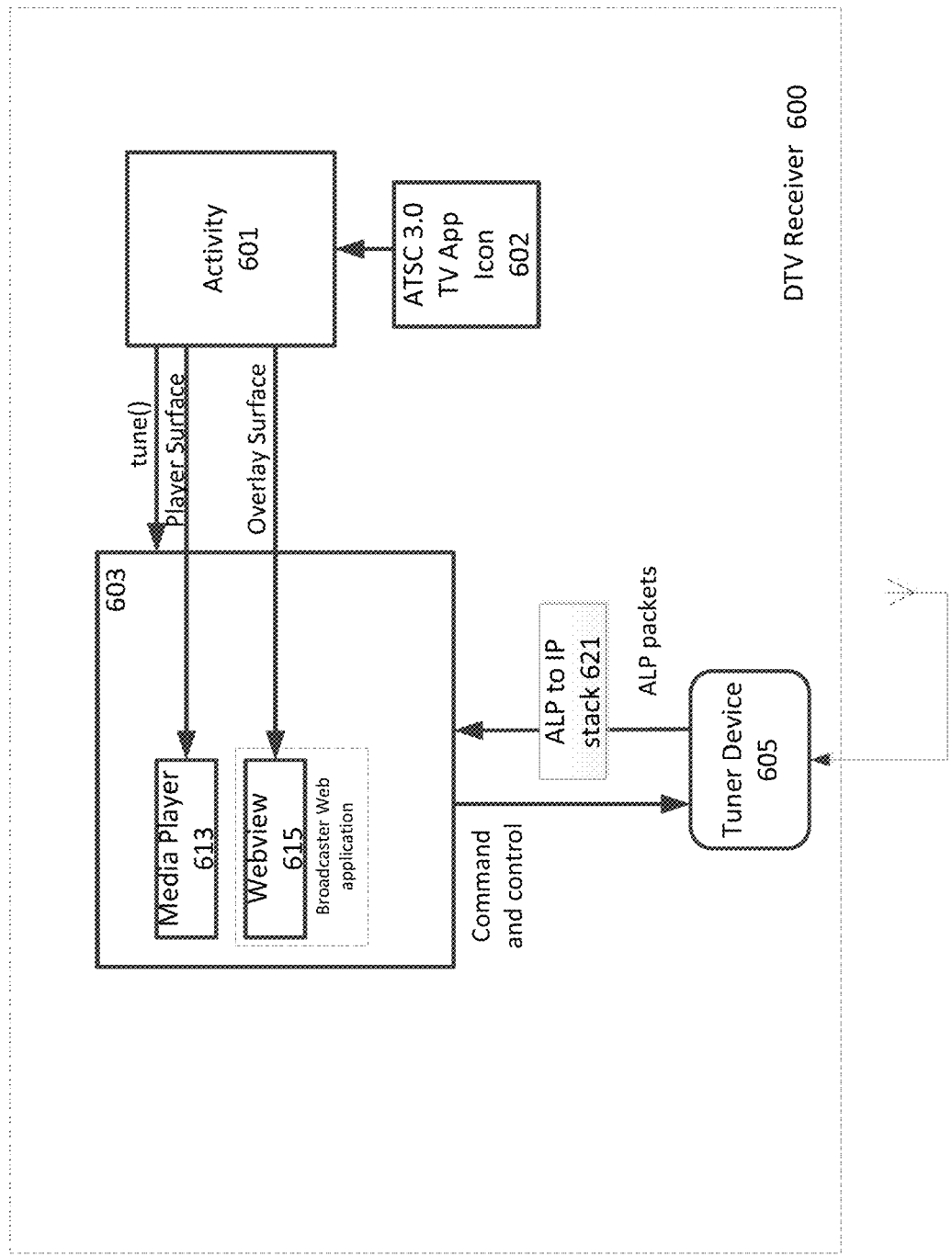
FIG. 6 illustrates an exemplary receiver having a tuner device incorporated therein.

FIG. 6 is a block diagram of an embodiment of a DTV receiver 600 having a television receiver application 603 such as an ATSC 3.0 television receiver application. The television receiver application 603 provides functionality allowing the rendering and display to the user of broadcast (and OTT) streaming video, as well as audio and closed captioning data. Furthermore, the television receiver application 603 may support a "runtime environment" through which broadcaster applications may be executed. A broadcaster application may include content that includes HTML, markup, JavaScript, and CSS as specified in the A/344 Standard. In addition to functionality supported by standard web browsers, additional functionality may be incorporated by means of a Web Sockets protocol. The Web Sockets APIs specified in the A/344 Standard add support for capabilities including access to tuning functions, memory management, interaction between the broadcaster application and the receiver's media player (RMP), among many others.

In some embodiments, a broadcaster application may be provided by a broadcaster as an adjunct to a regular streaming broadcast television service to provide interactivity or to operate in the background, for example, to monitor the user's usage of the service. Furthermore, the broadcaster may define a type of service that is presented as the output of the broadcaster application that is associated with that service. Such services may not be offered by an ATSC 3.0 receiver that does not support the A/344 Standard interactive content specification.

The DTV receiver 600 includes an associated Android activity 601 component. When the user activates the television receiver application 603 in the DTV receiver 600, by selecting the "TV" input or by selecting, for example, an "ATSC 3.0 TV" icon 602, the activity 601 is launched. The media player 613 may be an application level media player for Android, such as ExoPlayer. The media player 613 may also support Dynamic Adaptive Streaming over HTTP (DASH), SmoothStreaming, and Common Encryption.

The activity 601 component can accept user input from a remote control unit (RCU) or keypad to support channel change or selection, which is reflected by the "tune( )" function. A function that may be performed by the activity 601 is to create two viewing surfaces that give the user a view of the video associated with the service (the "Player Surface") and any overlays (the "Overlay Surface") that a broadcaster application (e.g., HTML5 web application) might produce. The Player Surface may be handled by the media player 613, while the Overlay Surface may be handled by Webview 615.

In FIG. 6, the tuner device 605 is a hardware device that can tune to and demodulate an ATSC 3.0 broadcast signal, and produce a sequence of ATSC 3.0 Link layer Protocol (ALP) packets. In some embodiments, the ALP packets are converted to IP packets by an ALP to IP converter 621. The link layer processing used to retrieve IP packets from ALP packets (mainly involving IP header decompression) can be done either within the tuner device 605 or within the television receiver application 603.

In some embodiments, the television receiver application 603 interfaces with the tuner device 605 through specialized extensions to the OS system (e.g., Android) calls. The tuner device 605 delivers ALP packets from among the PLPs it has been configured to process. The television receiver application 603 may perform various configuration operations on the tuner device 605, including to command it to tune to a particular RF frequency, as well as to process particular PLPs. Once the television receiver application 603 has configured the tuner device 605 to process particular PLPs, the television receiver application 603 may also have required information to begin retrieving audio, video, and caption packets from the broadcast and have them sent to media player 613 for decoding and rendering.

In some embodiments, the tuner device 605 demodulates PLPs to produce ALP packets which carry link-layer signaling including LMTs and ALP packets containing data required to decompress IP packets, in addition to packets containing low-level and Service Layer Signaling (SLS) tables, and files associated with services. The "ALP to IP" function 621 converts ALP packets containing IP packets into IP packets by performing decompression, and in some embodiments, converts LMT instances carried in ALP packets into IP packets for delivery across an interface between the "ALP to IP" function 621 and the middleware.

Figure 7:
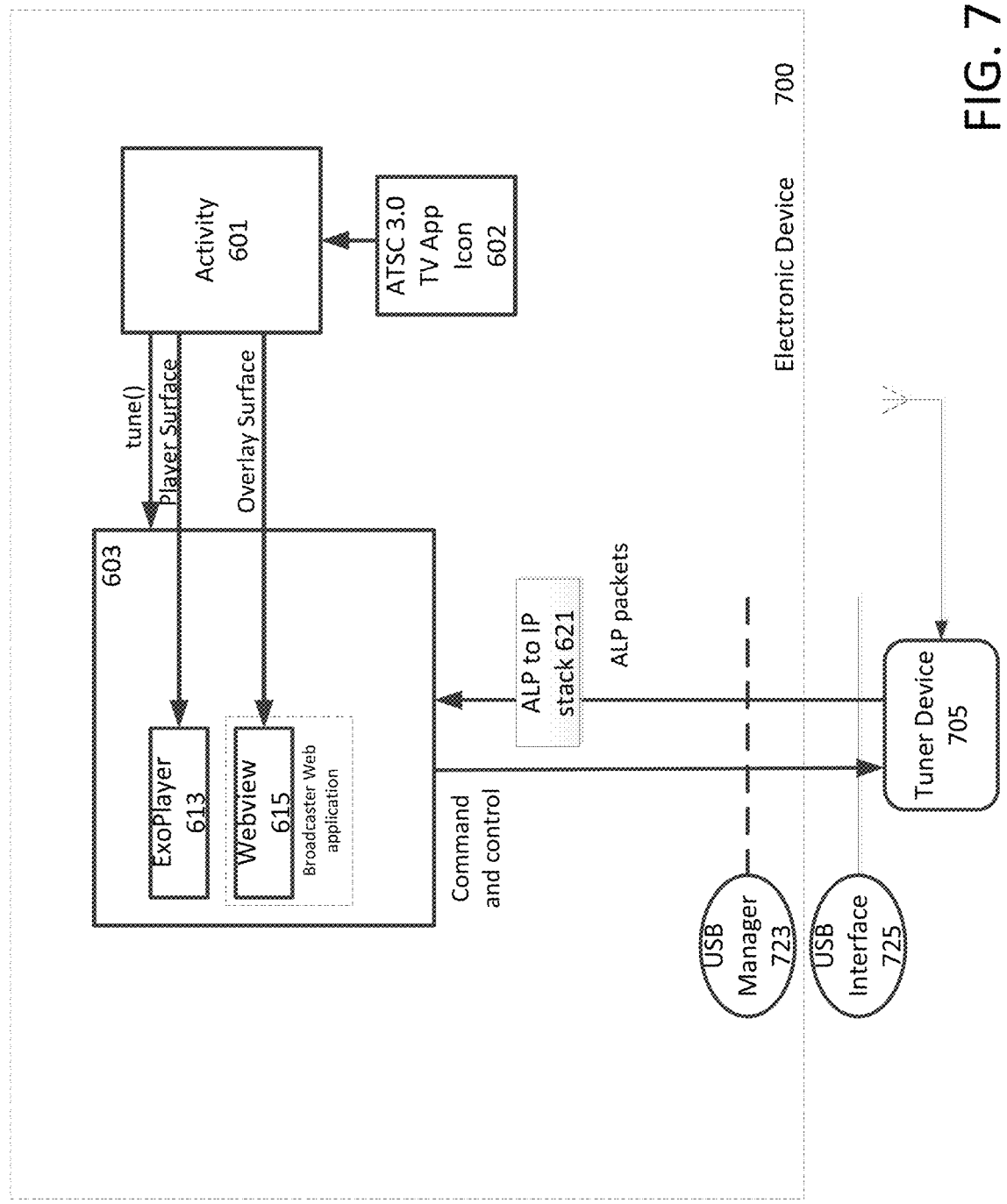
FIG. 7 illustrates an exemplary receiver connected to a tuner device via a Universal Serial Bus (USB) interface.

FIG. 7 illustrates a receiver in an electronic device 700. The electronic device 700 may be, for example, a set-top box, tablet computer, laptop, or smartphone which does not contain any native tuning capability. The electronic device 700 may be a television to which additional tuning functionality is to be added. In some embodiments, the tuner device 705 is an external USB-connected device that connects to the electronic device 700 via a USB port. Upon being launched, the television receiver application 603 may use a UsbManager Android Class 723 for delivering and receiving information across the USB interface 725. Furthermore, in other embodiments, the interface 725 is a WiFi interface where external hardware 800 communicates with electronic device 700 wirelessly.

In the embodiment illustrated in FIG. 7, the tuner device 705 delivers ALP packets from the broadcast across the USB interface 725, and the ALP to IP converter block 621 performs conversion of ALP packets containing LMTs to IP packets in accordance with embodiments disclosed herein. In some embodiments, in the architectures of the receivers illustrated in FIGS. 6 and 7, the upper or middle layer software processes have the ability to send commands to the tuner device 605 and 705, respectively, that causes the tuner device to process any specified PLP. An example of the API and commands that permit the television receiver application 603 in the electronic device 700 to communicate with the tuner device 705 across the USB interface is disclosed in the application titled "Television Receiver Application for Non-Television Devices, filed on [INSERT DATE], App. No. [INSERT APP.], the entire contents of which are incorporated by reference.

Figure 8:
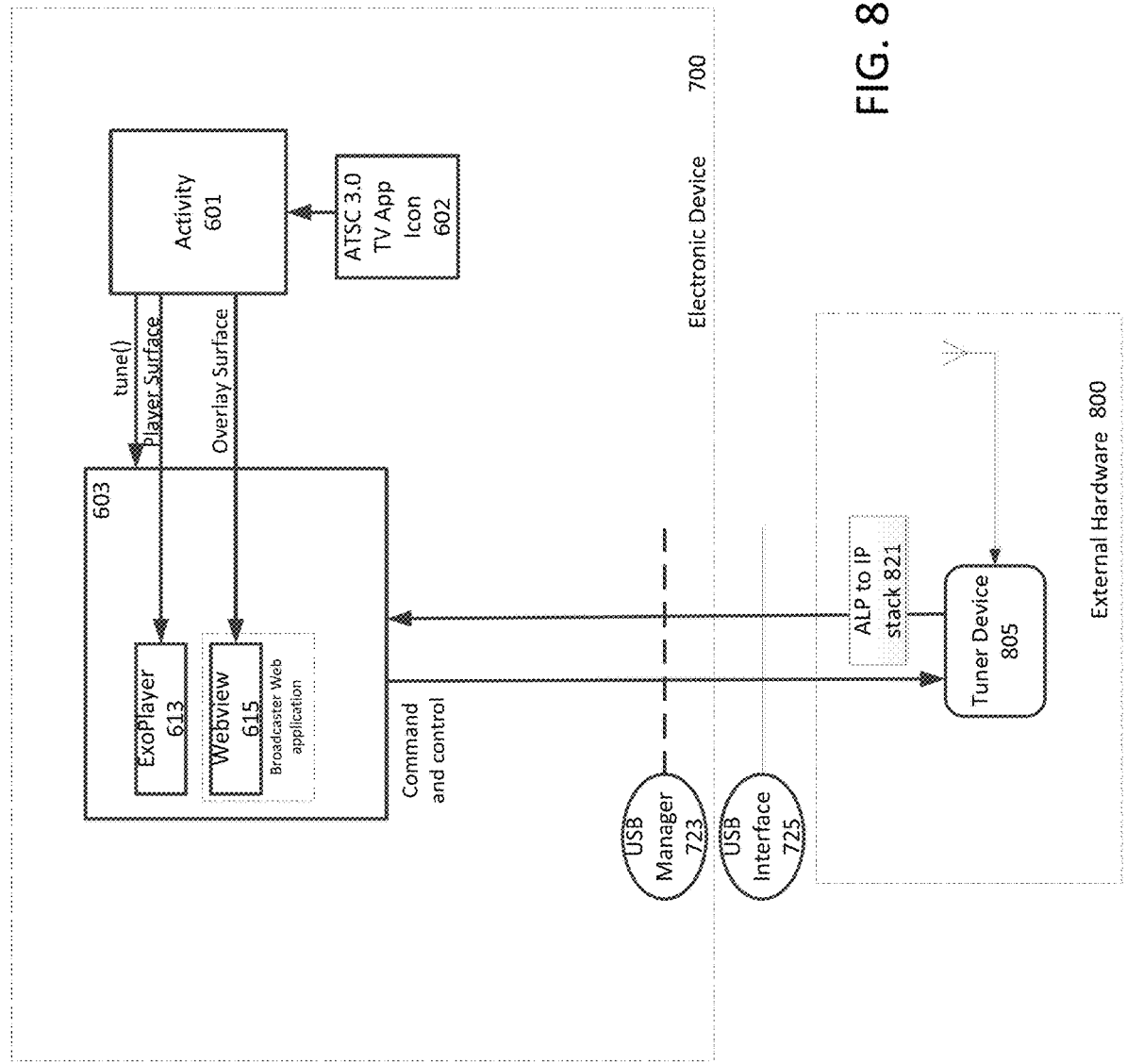
FIG. 8 illustrates an exemplary receiver connected, via a USB interface, to external hardware that includes a tuner device and an ALP to IP packet converter.

FIG. 8 illustrates an embodiment of an electronic device 700 in which external hardware 800 includes a tuner device 805 and also the "ALP to IP" converter block 821. The ALP to IP converter block 821 includes the ability to convert ALP packets containing LMTs in accordance with embodiments of the present disclosure. In some embodiments according to the implementation in FIG. 8, only IP packets flow across the portion of the USB or WiFi interface.

According to some embodiments, signaling tables are present in the link-layer signaling portion of the ATSC 3.0 broadcast which identify PLPs, which will deliver IP packets associated with a given source and destination IP address and port. These link-layer signaling tables are not delivered in IP packets in the broadcast emission. However, in some embodiments, the middle and upper-layer software processes in the receiver only process files and delivery objects transported in IP packets. Embodiment of the present disclosure describe methods whereby the middle- and upper-layer software processes can access these link-layer signaling tables.

According to some embodiments, the LMTs can be transported inside the UPD/IP packets to the middle and upper-layer software stack. These LMTs are used by the middle and upper-layer processes in the electronic device 700 to determine which PLPs the tuner device should activate. In some embodiments, the LMT is a data structure 900 as illustrated in FIG. 9 and defined in the A/330 Standard, Section 7.1.

In some embodiments, a predetermined IP address/port is designated for IP packets containing LMT instances. The tuner device 805 captures ALP packets containing LMT tables and converts them into ALP packets carrying an IP packet using the predetermined IP address/port that has been designated for LMT instances. The middle or upper-level software process in the electronic device 700 may process IP packets associated with the predetermined IP address/port to extract LMT(s) to determine which PLPs to activate in the tuner device 805. Furthermore, in some embodiments, the LLS tables are delivered to the middleware in IP packets with an IP address/port that is designated for LLS tables such as the SLT as described in the A/331 Standard, Section 6.1.

In one embodiment, the IP address/port that can be used for designating LMT instances is the same multicast IP address assigned to the ATSC for its use (224.0.23.60) but with a destination port value one higher than that assigned to ATSC by LANA, or 4938. Port 4938 is currently unassigned by the Internet Assigned Numbers Authority (IANA). IANA has assigned 224.0.23.60 to "AtscSvcSig."

FIG. 10 illustrates an example ALP packet 1000 that contains an LMT. In some embodiments, an ALP packet containing an LMT that is less than 2048 bytes is structured as follows:
  a. ALP_packet_header( ) (e.g., A/330 Standard, Table 5.1):
    packet_type='100' indicating "Link layer signaling packet"
    payload_configuration='0' indicating the ALP packet contains one whole object (no concatenation)
    header_mode='0' indicating less than 2048 byte payload
    length={the length of the LMT}
  b. Additional header for signaling information (signaling_information_hdr( ), A/330 Standard, Table 5.10)
    signaling_type=0x01 indicating LMT
    signaling_type_extension=0xFFFF
    signaling_version—see below
    signaling_format, signaling_encoding, reserved bits=0x0F
  c. link_mapping_table( ) (FIG. 9)

FIG. 11 illustrates an example ALP packet 1100 that includes an IP packet containing an LMT. For example, the ALP packet 1100 includes an ALP packet header 1100*a*, an IP header 1100*b*, a UDP header 1100*c*, and a LMT header 1100*d*. The IP header 1100*b* may include a predetermined IP address (e.g., destination address), and the UDP header 1100*c* may include a predetermined port number (e.g., destination port), both of which are designated to indicate that ALP packet 1100 contains an LMT, such as LMT 900 (FIG. 9). In some embodiments, when the ALP packet 1000 (FIG. 10) containing the LMT is detected by a tuner device, the LMT is extracted and encapsulated with LMT header 1100*d*, UDP header 1100*c*, IP header 1100*b*, and ALP header 1100*a*.

In some embodiments, an ALP packet containing an uncompressed IPv4 packet of less than 2048 bytes, and encapsulating an LMT that fits in such a packet, is structured as follows as illustrated in FIG. 11:
  a. ALP_packet_header( ) (e.g., A/330 Standard, Table 5.1):
    packet_type='000' indicating "IPv4 packet"
    payload_configuration='0' indicating the ALP packet contains one whole object (no concatenation)
    header_mode='0' indicating less than 2048 byte payload
    length={the length of the UDP/IP packet}
  b. IP Header (e.g., Internet Control Message Protocol: DARPA Internet Program Protocol Specification, RFC 792, dated September 1981, the entirety of which is incorporated herein by reference)
    Version=4 indicating "IPv4"
    IHL=5 indicating 5 32-bit words in header
    Type of Service=0 indicating normal
    Total Length=total length of IP datagram, including all headers and data
    Identification=0 (no fragmentation)
    Flags=0 (last and only fragment)
    Fragment Offset=0 (not fragmented)
    Time to Live=0xFF (anything nonzero means packet is allowed to remain)
    Protocol=0xFF (not used)
    Header Checksum=0x0000 (not used)
    Source Address=0.0.0.0 (not used)
    Destination Address=224.0.23.60—assigned by IANA to ATSC as "AtscSvcSig"
  c. UDP Header (User Datagram Protocol, RFC 768, dated Aug. 28, 1980)
    Source Port=0x0000 (not used)
    Destination Port=4938 (0x134A in hexadecimal), indicating the payload will be an LMT
    Length=length in octets of the LMT+8 (for the UDP header)
    Checksum=0x0000 (not used
  d. LMT Header (see below)
    LMT_version=value of the signaling_version field of the ALP packet that contained this LMT
    LMT_PLP_ID=identification of the PLP that the LMT contained here was transported in.
  e. link_mapping_table( ) (FIG. 9)

In some embodiments, ALP packets longer than 2048 bytes may be accommodated for when the length of an LMT exceeds the approximately 2000 bytes from the previously disclosed example. In some embodiments, as defined in the A/330 Standard, the header_mode field, when set to '1', indicates the presence of an Additional Header for single packets. The Additional Header may carry five MSBits of the length when it exceeds the length that can be represented in the 11-bit length field at the beginning of the ALP packet. With the use of the header_mode and Additional Header, 16 bits of length are represented, and ALP packets of 65,535 bytes can be transported. These disclosed examples show that an LMT can be transferred from its original delivery within an ALP packet, to be transported within the payload of an UDP/IP packet.

According to some embodiments, each instance of the LMT describes mappings between PLPs and IP addresses/ports for any IP address/port associated with any service referenced in the SLT (e.g., A/331 Standard, Section 6.3) carried in the identified PLP carrying the LLS tables. Furthermore, in some embodiments, an LMT shall be present in any PLP identified as carrying LLS.

Since multiple PLPs may carry LLS, a given ATSC 3.0 broadcast emission may include multiple different instances of LMTs. In some embodiments, the middleware layers can access these multiple different LMTs and keeps track of them to compile a complete picture of the PLP to IP address/port mappings for the full emission. As an example, the "LMT header," which includes the LMT Version and the identification of the PLP associated with this LMT instance may be used to keep track of the multiple LMT instances. The version associated with a given LMT instance may be used by the receiver to determine whether or not any given instance of an LMT needs to be processed or can be discarded as a duplicate. For example, referring to FIG. 4, the LMT delivered in PLP #2 may be at version 2, while the LMT delivered in PLP #4 is at version 6. The version is correlated to the PLP associated with the delivery of that LMT instance.

When the LMT is delivered in an ALP packet, the 8-bit signaling_version field (see A/330 Standard, Table 5.10) is included in the LMT Header part of the packet to indicate changes in the LMT. For example, the value of this field shall be incremented by 1 whenever any data of the LMT changes. To convey this information when the LMT is delivered in an IP packet, the signaling_version field may be transported in the IP packet in the LMT_version field, located just preceding the LMT itself.

Figure 12:
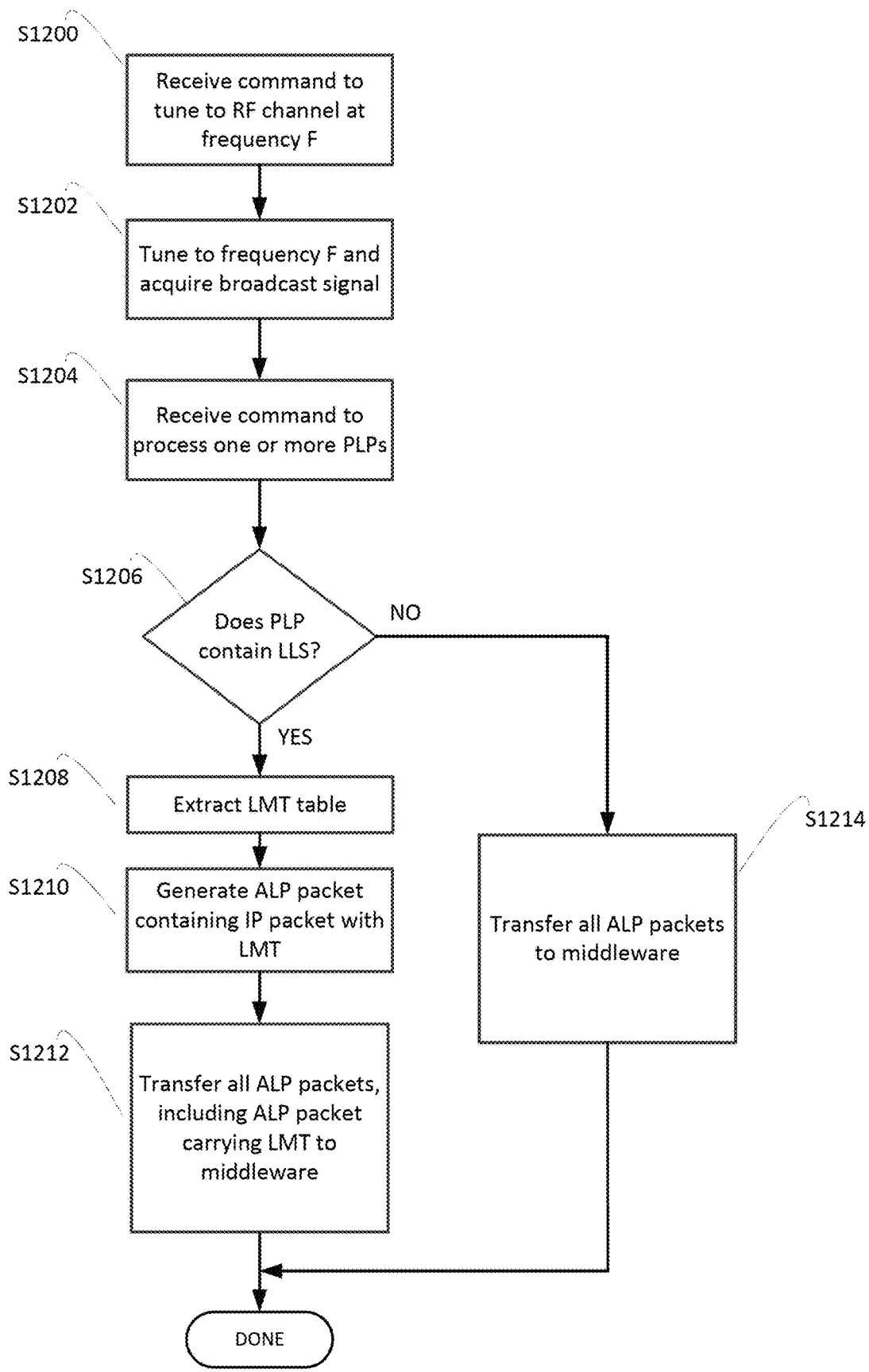
FIG. 12 illustrates an exemplary process performed by the tuner device.

FIG. 12 illustrates an embodiment of a process performed by a tuner device such as tuner device 605, 705, or 805. The process illustrated in FIG. 12 may be initiated by the television receiver application in response to the user requesting access to a particular ATSC 3.0 television service. The command to the tuner to tune to a particular RF channel may arise from the television receiver application's prior knowledge of what RF channel the requested service is transmitted on, usually discovered by a channel scan process.

The process may generally start at step S1200 where the tuner device receives a command from the television receiver application to tune to a particular RF channel. For example, when a DTV receiver is first turned on, the television receiver application may be launched and it may send an instruction to the tuner device to reacquire the last tuned channel. Similarly, when a tuner device is connected to an electronic device via USB, the television receiver application may send an instruction to tune to the last tuned channel. The process proceeds to step S1202 where the requested RF channel is tuned and a digital broadcast signal is acquired.

In step S1204, the tuner receives a command from the television receiver application to process one or more PLPs. In some embodiments, the maximum number that can be requested is four, which corresponds to the capability of practical tuner devices. The set of PLPs the receiver application requests in S1204 may be based on previously determined information about the service, specifically, which PLPs the service may be using. In some rare cases, the broadcaster may change the configuration of the broadcast signal, to, for example, begin using different PLPs for the service. In this scenario, the receiver application may perform a "channel map refresh" of the tuned RF channel, which involves first processing (possibly in sequence, at most four at a time) all the PLPs in the broadcast signal so that all the LMTs and SLTs can be retrieved and recorded. After the "channel map refresh" is performed, the indicated PLPs can be requested.

In step S1206 it is determined, for each selected PLP, whether it contains LLS. For each processed PLP that does not contain LLS (e.g., L1D_plp_lls_flag is set to '0'), the process continues at step S1214 wherein all ALP packets from the selected PLPs are transferred to the middleware layers in the receiver application. Returning to S1206, for each selected PLP that does contain LLS (e.g., L1D_plp_lls_flag is set to '1'), the process proceeds to step S1210 to extract ALP packets containing the LMT. The process proceeds to step S1210 where an ALP packet containing an IP packet with the LMT, such as ALP packet 1100, is generated. The ALP packet generated in step S1210 includes the LMT extracted in step S1208. The ALP packet generated in step S1210 includes the LMT header 1100d containing the LMT version field and a field specifying the ID of the PLP carrying the LMT. Note that the process beginning at S1206 is performed continuously for each selected PLP.

The ALP packet generated in step S1210 also includes the UDP header 1100c and IP header 1100d. Furthermore, the UDP header 1100c may specify a destination port, and the IP header 1100d may specify a destination address, both of which are designated to indicate the presence of the LMT. Additionally, the ALP packet generated in step S1210 includes the ALP packet header 1100a. The process proceeds to step S1212 where the ALP packets from the selected PLPs and the ALP packet with the IP packet carrying the LMT are transferred to middleware processes. In some embodiments, where the tuner device is configured to output IP packets, the ALP to IP converter may be bypassed.

Figure 13:
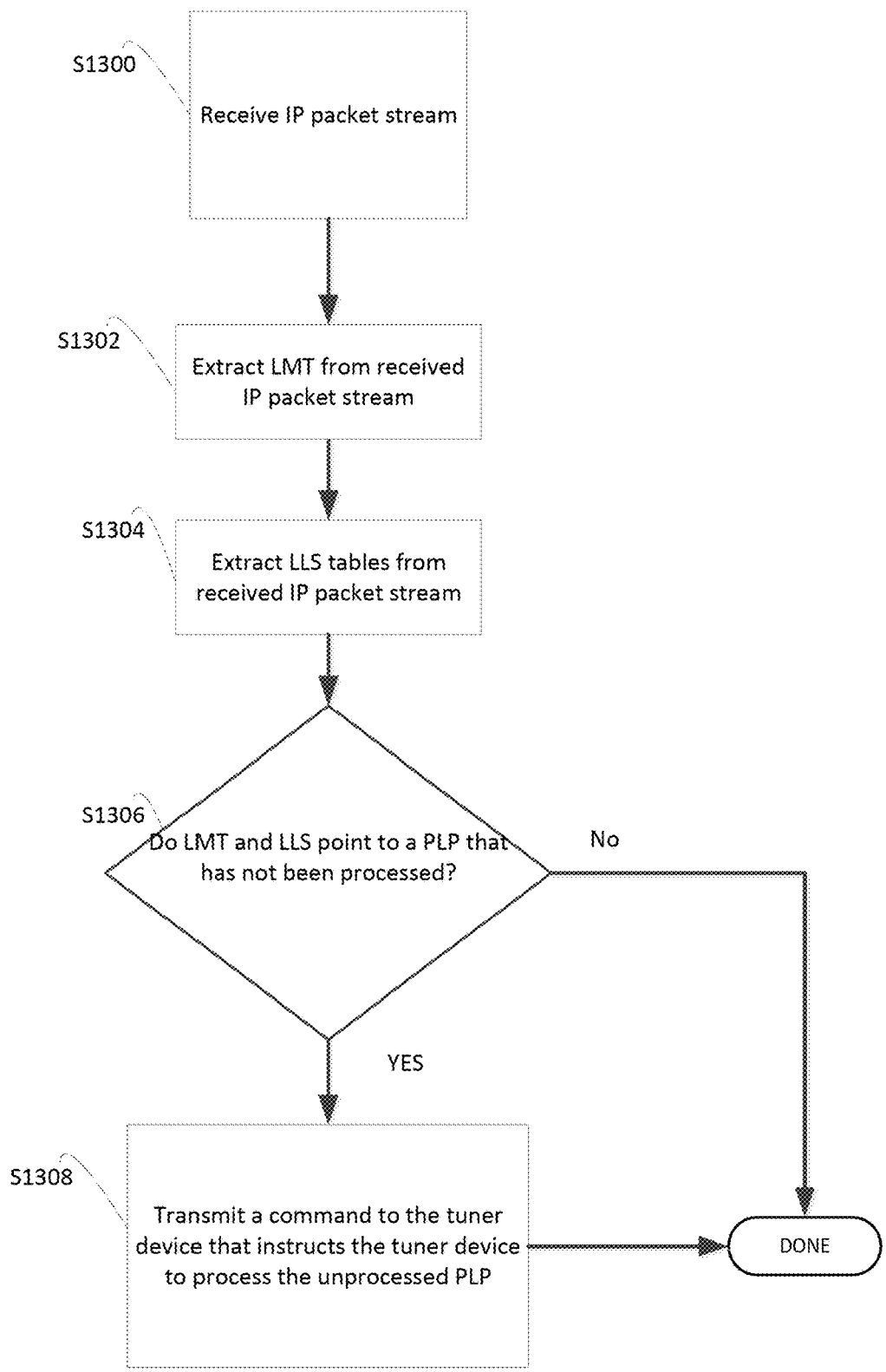
FIG. 13 illustrates an exemplary process performed by the receiver.

FIG. 13 illustrates an embodiment of a process performed by a television receiver application. The process may generally start at step S1300 where an IP packet stream is received. The IP packet stream may originate as a stream of ALP packets from a tuner device (e.g., 605, 705, 805), where the stream of ALP packets is passed through an ALP to IP converter (e.g., 621, 821) to produce the IP packet stream.

The process proceeds to step 1302, where the LMT is extracted from the IP stream. For example, the IP packet containing the LMT is detected when the IP packet includes an address and port designated to indicate the presence of the LMT (e.g., Destination Address in IP header 1100b and Destination Port in UDP header 1100c).

The process proceeds to step 1304, where LLS tables are retrieved from the received IP packet stream. As an example, the LLS tables are included in IP packets having an address and port that are designated to indicate the presence of LLS tables. In some embodiments, the LLS tables are transmitted in the same IP packet stream that contain the LMT. Furthermore, as an example, the LLS tables may contain a SLT, which specifies one or more IP addresses for a service.

The process proceeds to step S1306, where it is determined whether the LMT and LLS point to a PLP that has yet to be selected for processing. For example, this situation may occur when the SLT specifies that service A requires IP address A, the LMT specifies that PLP #5 (FIG. 4) includes ALP packets for IP address A, and PLP #5 was not one of the PLPs that was processed by the tuner in step S1204 (FIG. 12). If the LMT and LLS point to an unprocessed PLP, the process proceeds to step S1308, where the television receiver application transmits a command to the tuner device that instructs the tuner device to process the unprocessed PLP. However, the LMT and the LLS do not point to an unprocessed PLP, the process in FIG. 13 ends. Once the television receiver has all the packets it needs as indicated in the extracted LMT and LLS table, the television receiver application can decode and output audio and visual content corresponding to a service associated with the broadcast stream.

Figure 14:
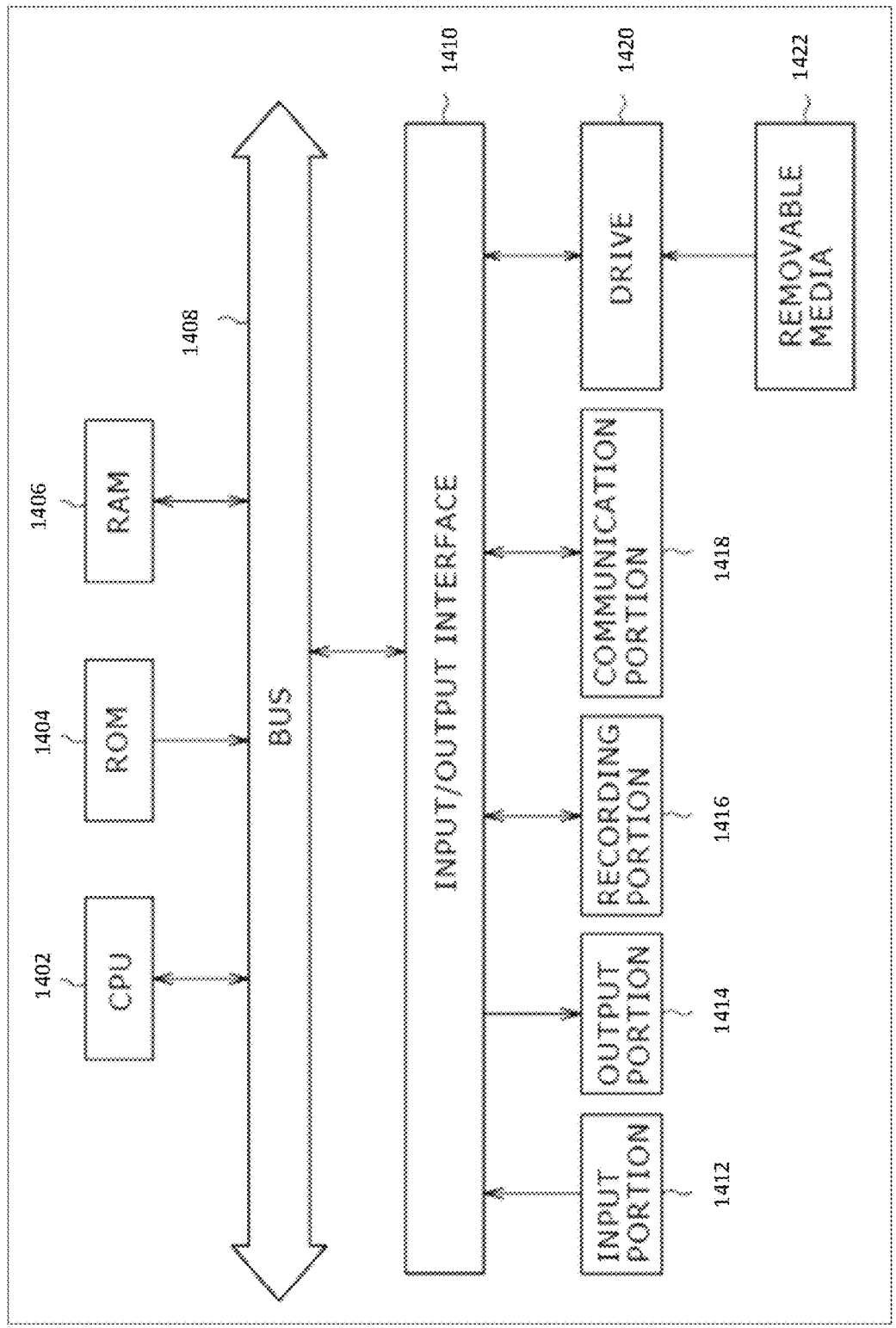
FIG. 14 illustrates an example hardware configuration of a computer.

FIG. 14 is a block diagram showing an example of a hardware configuration of a computer that can be configured to perform functions of any one or a combination of reception apparatus and service distribution system. For example, in one embodiment, the computer is configured to perform one or a combination of the functions or steps described herein with respect to the TV device, electronic device, and/or the tuner device.

As illustrated in FIG. 14 the computer includes a CPU 1402, ROM (read only memory) 1404, and a RAM (random access memory) 1406 interconnected to each other via one or more buses 1408. The one or more buses 1408 are further connected with an input-output interface 1410. The input-output interface 1410 is connected with an input portion 1412 formed by a keyboard, a mouse, a microphone, remote controller, etc. The input-output interface 1410 is also connected to an output portion 1414 formed by an audio interface, video interface, display, speaker and the like; a recording portion 1416 formed by a hard disk, a non-volatile memory or other non-transitory computer readable storage medium; a communication portion 1418 formed by a network interface, modem, USB interface, fire wire interface, etc.; and a drive 1420 for driving removable media 1422 such as a magnetic disk, an optical disk, a magneto-optical disk, a semiconductor memory, etc.

According to one embodiment, the CPU 1402 loads a program stored in the recording portion 1416 into the RAM 1406 via the input-output interface 1410 and the bus 1408, and then executes a program configured to provide the functionality of the one or a combination of the functions described herein with respect to the TV device, electronic device, and/or the tuner device.

The hardware description above, exemplified by any one of the structure examples shown in FIGS. 2, 3, and 14, constitutes or includes specialized corresponding structure that is programmed or configured to perform the algorithm describe above, for example with reference to FIGS. 12 and 13. For example, any one or a combination of the algorithms shown in FIGS. 12 and 13 may be completely performed by the circuitry included in the TV device shown in FIG. 2. Furthermore, when an electronic device with an externally connected tuner device is performing the algorithms shown in FIGS. 12 and 13, the circuitry included in the tuner device, as shown in FIG. 3, may be used for the algorithm in FIG. 12, and the circuitry included in the electronic device, as shown in FIG. 3, may be used for the algorithm in FIG. 13.

The embodiments of the present disclosure provide significantly advantageous features such as:

1. A method to allow middle and upper-level software processes in the ATSC 3.0 receiver to have convenient access to LMT(s) delivered in the ATSC 3.0 broadcast signal as Link Layer Signaling for optimal control over the tuner device's selection of which PLP to process.
2. A method which allows a tuner device to deliver all data received from an ATSC 3.0 broadcast to the middle and upper-level software processes in the form of multicast IP packets, thereby eliminating the need to deliver Link Layer Signaling in some other format.
3. A method to allow Link Layer Signaling tables originating from different portions of an ATSC 3.0 broadcast emission, each portion transporting LLS on a different PLP, to be transported in a single stream of IP packets to the middle and upper-level software processes in the ATSC 3.0 receiver.

Obviously, numerous modifications and variations are possible in light of the above teachings. It is therefore to be understood that within the scope of the appended claims, the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the present disclosure, as well as other claims. The disclosure, including any readily discernible variants of the teachings herein, defines, in part, the scope of the foregoing claim terminology such that no inventive subject matter is dedicated to the public.

The above disclosure also encompasses the embodiments listed below.

(1) A reception apparatus including processing circuitry configured to (i) receive IP packets that include signaling information originating from an Advanced Television Systems Committee (ATSC) broadcast stream received by a tuner device, the broadcast stream including a plurality of physical layer pipes (PLPs), each PLP containing a plurality of ATSC link-layer protocol (ALP) packets, (ii) extract the signaling information from the IP packets, the signaling information including a link mapping table (LMT) and at least one low level signaling (LLS) table, the LMT being identified based on a predetermined IP address and port designated to indicate the presence of the LMT, and (iii) retrieve, based on the extracted LMT and extracted at least one LLS table, audio and visual content corresponding to a service associated with the broadcast stream.

(2) The reception apparatus according to feature (1), further including the tuner device that outputs ALP packets and ALP to IP converter circuitry configured to convert each outputted ALP packet to an IP packet.

(3) The reception apparatus according to feature (1) or feature (2), further including a universal serial bus (USB) interface, wherein the tuner device is configured to connect to the reception apparatus via the USB interface.

(4) The reception apparatus according to feature (3), in which the tuner device includes ALP to IP converter circuitry configured to convert each ALP packet outputted from the tuner device to an IP packet.

(5) The reception apparatus according to any one of features (1)-(4), in which the IP packet that contains the LMT further includes an LMT header that specifies (i) an LMT version and (ii) a PLP ID field that identifies the PLP containing the LMT, and in which a combination of the LMT version and PLP ID provides a reference identifier for the LMT.

(6) The reception apparatus according to any one of features (1)-(5), in which the processing circuitry is further configured to identify an IP address specified in the at least one LLS table, the IP address corresponding to the service associated with the broadcast stream, determine whether the LMT specifies an unprocessed PLP from the plurality of PLPs that is associated with the specified IP address, and in response to the determination that the LMT specifies the unprocessed PLP, communicate a command to the tuner device that instructs the tuner device to output the ALP packets associated with the unprocessed PLP.

(7) A tuner device including a communication interface configured to connect to a reception apparatus that executes a television receiver application; and processing circuitry configured to (i) receive a digital television broadcast signal that includes a plurality of physical layer pipes (PLPs), each PLP containing a plurality of ATSC link-layer protocol (ALP) packets, (ii) identify at least one PLP from the plurality PLPs that includes low level signaling (LLS), (iii) extract a link mapping table (LMT) from the at least one PLP including the LLS, (iv) generate an ALP packet including an IP packet, which contains the LMT and has a predetermined IP address and port, and (v) transfer the ALP packet containing the IP packet with the LMT to the television receiver application.

(8) The tuner device according to feature (7), in which the predetermined IP address and port are designated for the LMT.

(9) The tuner device according to feature (8), in which the IP packet that includes the LMT further includes an LMT header that specifies (i) an LMT version and (ii) a PLP ID field that identifies the PLP containing the LMT, wherein a combination of the LMT version and PLP ID provides a reference identifier for the LMT.

(10) The tuner device according to any one of features (7)-(9), wherein the at least one identified PLP that includes LLS is identified based on a flag that indicates the presence of LLS.

(11) The tuner device according to any one features (7)-(10), in which the IP packet with the LMT and at least one LLS table are transmitted to the television receiver application in a same IP packet stream.

(12) The tuner device according to any one of features (7)-(11), wherein the tuner device receives a command from the television receiver application to process one or more PLPs from the plurality of PLPs, wherein the identified at least one PLP that includes the LLS is included in the processed one or more PLPs.

(13) A non-transitory computer-readable medium storing instructions, which when executed by a processor, causes the processor to perform a method including (i) receiving IP packets that include signaling information originating from an Advanced Television Systems Committee (ATSC) broadcast stream received by a tuner device, the broadcast stream including a plurality of physical layer pipes (PLPs), each PLP containing a plurality of ATSC link-layer protocol (ALP) packets; (ii) extracting the signaling information from the IP packets, the signaling information including a link mapping table (LMT) and at least one low level signaling (LLS) table, the LMT being identified based on a predetermined IP address and port designated to indicate the presence of the LMT; and (iii) retrieving, based on the extracted LMT and extracted at least one LLS table, audio and visual content corresponding to a service associated with the broadcast stream.

(14) The non-transitory computer readable medium according to feature (13), in which the IP packet that contains the LMT further includes an LMT header that specifies (i) an LMT version and (ii) a PLP ID field that identifies the PLP containing the LMT, wherein a combination of the LMT version and PLP ID provides a reference identifier for the LMT.

(15) The non-transitory computer readable medium according to feature (13) or feature (14), in which the method further includes identifying an IP address specified in the at least one LLS table, the IP address corresponding to the service associated with the broadcast stream; determining whether the LMT specifies an unprocessed PLP from the plurality of PLPs that is associated with the specified IP address; and in response to the determination that the LMT specifies the unprocessed PLP, communicating a command to the tuner device that instructs the tuner device to output the ALP packets associated with the unprocessed PLP.

(16) A non-transitory computer-readable medium storing instructions, which when executed by a processor, causes the processor to perform a method including receiving a digital television broadcast signal that includes a plurality of physical layer pipes (PLPs), each PLP containing a plurality of ATSC link-layer protocol (ALP) packets; identifying at least one PLP from the plurality PLPs that includes low level signaling (LLS); extracting a link mapping table (LMT) from the at least one PLP including the LLS; generating an ALP packet including an IP packet, which contains the LMT and has a predetermined IP address and port; and transferring the ALP packet containing the IP packet with the LMT to a reception apparatus that executes a television receiver application.

(17) The non-transitory computer readable medium according to feature (16), in which the predetermined IP address and port are designated for the LMT.

(18) The non-transitory computer readable medium according to feature (17), in which the IP packet that includes the LMT further includes an LMT header that specifies (i) an LMT version and (ii) a PLP ID field that identifies the PLP containing the LMT, and in which a combination of the LMT version and PLP ID provides a reference identifier for the LMT.

(19) The non-transitory computer readable medium according to any one of features (16)-(18), in which the at least one identified PLP that includes LLS is identified based on a flag that indicates the presence of LLS.

(20) The non-transitory computer readable medium according to feature 16, wherein the IP packet with the LMT and at least one LLS table are transmitted to the television receiver application in a same IP packet stream.

The invention claimed is:

1. A reception apparatus comprising:
processing circuitry configured to:
receive IP packets that include signaling information originating from an Advanced Television Systems Committee (ATSC) broadcast stream received by a tuner device, the broadcast stream including a plurality of physical layer pipes (PLPs), each PLP containing a plurality of ATSC link-layer protocol (ALP) packets,
extract the signaling information from the IP packets, the signaling information including a link mapping table (LMT) and at least one low level signaling (LLS) table, an IP packet of the IP packets that includes the LMT being generated by an ALP to IP converter to include a predetermined IP address and port designated to indicate presence of the LMT, and
retrieve, based on the extracted LMT and extracted at least one LLS table, audio and visual content corresponding to a service associated with the broadcast stream.

2. The reception apparatus according to claim 1, further comprising:
the tuner device that outputs the ALP packets; and
ALP to IP converter circuitry configured to convert the outputted ALP packets to the IP packets.

3. The reception apparatus according to claim 1, further comprising:
a universal serial bus (USB) interface, wherein the tuner device is configured to connect to the reception apparatus via the USB interface.

4. The reception apparatus according to claim 1, wherein the IP packet that contains the LMT further includes an LMT header that specifies (i) an LMT version and (ii) a PLP ID field that identifies the PLP containing the LMT, wherein a combination of the LMT version and PLP ID provides a reference identifier for the LMT.

5. The reception apparatus according to claim 1, wherein the processing circuitry is further configured to:
identify an IP address specified in the at least one LLS table, the IP address corresponding to the service associated with the broadcast stream,
determine whether the LMT specifies an unprocessed PLP from the plurality of PLPs that is associated with the specified IP address, and
in response to the determination that the LMT specifies the unprocessed PLP, communicate a command to the tuner device that instructs the tuner device to output the ALP packets associated with the unprocessed PLP.

6. The reception apparatus according to claim 3, wherein the tuner device includes ALP to IP converter circuitry configured to convert the ALP packets outputted from the tuner device to the IP packets.

7. A tuner device comprising:
a communication interface configured to connect to a reception apparatus that executes a television receiver application; and
processing circuitry configured to:
(i) receive a digital television broadcast signal that includes a plurality of physical layer pipes (PLPs), each PLP containing a plurality of ATSC link-layer protocol (ALP) packets,
(ii) identify at least one PLP from the plurality PLPs that includes low level signaling (LLS),
(iii) extract a link mapping table (LMT) from the at least one PLP including the LLS,
(iv) generate an ALP packet including an IP packet, which contains the LMT and has a predetermined IP address and port designated to indicate presence of the LMT, and
(v) transfer the ALP packet containing the IP packet with the LMT to the television receiver application.

8. The tuner device according to claim 7, wherein the predetermined IP address and port are designated for the LMT.

9. The tuner device according to claim 7, wherein the at least one identified PLP that includes LLS is identified based on a flag that indicates the presence of LLS.

10. The tuner device according to claim 7, wherein the IP packet with the LMT and at least one LLS table are transmitted to the television receiver application in a same IP packet stream.

11. The tuner device according to claim 7, wherein the tuner device receives a command from the television receiver application to process one or more PLPs from the plurality of PLPs, wherein the identified at least one PLP that includes the LLS is included in the processed one or more PLPs.

12. The tuner device according to claim 8, wherein the IP packet that includes the LMT further includes an LMT header that specifies (i) an LMT version and (ii) a PLP ID field that identifies the PLP containing the LMT, wherein a combination of the LMT version and PLP ID provides a reference identifier for the LMT.

13. A non-transitory computer-readable medium storing instructions, which when executed by a processor, causes the processor to perform a method comprising:
receiving IP packets that include signaling information originating from an Advanced Television Systems Committee (ATSC) broadcast stream received by a tuner device, the broadcast stream including a plurality of physical layer pipes (PLPs), each PLP containing a plurality of ATSC link-layer protocol (ALP) packets;
extracting the signaling information from the IP packets, the signaling information including a link mapping table (LMT) and at least one low level signaling (LLS) table, an IP packet of the IP packets that includes the LMT being generated by an ALP to IP converter to include a predetermined IP address and port designated to indicate presence of the LMT, and
retrieving, based on the extracted LMT and extracted at least one LLS table, audio and visual content corresponding to a service associated with the broadcast stream.

14. The non-transitory computer readable medium according to claim 13, wherein the IP packet that contains the LMT further includes an LMT header that specifies (i) an LMT version and (ii) a PLP ID field that identifies the PLP containing the LMT, wherein a combination of the LMT version and PLP ID provides a reference identifier for the LMT.

15. The non-transitory computer readable medium according to claim 13, wherein the method further comprises:
identifying an IP address specified in the at least one LLS table, the IP address corresponding to the service associated with the broadcast stream;
determining whether the LMT specifies an unprocessed PLP from the plurality of PLPs that is associated with the specified IP address; and
in response to the determination that the LMT specifies the unprocessed PLP, communicating a command to the tuner device that instructs the tuner device to output the ALP packets associated with the unprocessed PLP.

16. A non-transitory computer-readable medium storing instructions, which when executed by a processor, causes the processor to perform a method comprising:
receiving a digital television broadcast signal that includes a plurality of physical layer pipes (PLPs), each PLP containing a plurality of ATSC link-layer protocol (ALP) packets;
identifying at least one PLP from the plurality PLPs that includes low level signaling (LLS);
extracting a link mapping table (LMT) from the at least one PLP including the LLS;
generating an ALP packet including an IP packet, which contains the LMT and has a predetermined IP address and port designated to indicate presence of the LMT; and
transferring the ALP packet containing the IP packet with the LMT to a reception apparatus that executes a television receiver application.

17. The non-transitory computer readable medium according to claim 16, wherein the predetermined IP address and port are designated for the LMT.

18. The non-transitory computer readable medium according to claim 16, wherein the at least one identified PLP that includes LLS is identified based on a flag that indicates the presence of LLS.

19. The non-transitory computer readable medium according to claim 16, wherein the IP packet with the LMT and at least one LLS table are transmitted to the television receiver application in a same IP packet stream.

20. The non-transitory computer readable medium according to claim 17, wherein the IP packet that includes the LMT further includes an LMT header that specifies (i) an LMT version and (ii) a PLP ID field that identifies the PLP containing the LMT, wherein a combination of the LMT version and PLP ID provides a reference identifier for the LMT.

* * * * *